United States Patent Office 3,285,945
Patented Nov. 15, 1966

3,285,945
PROCESS FOR THE PRODUCTION OF
ESTER SALTS
Kurt Wember, Marl, Germany, assignor to Chemishe Werke Huls Aktiengesellschaft, Marl, Germany, a corporation of Germany
No Drawing. Filed Nov. 1, 1963, Ser. No. 320,941
Claims priority, application Germany, Nov. 9, 1962,
C 28,371
4 Claims. (Cl. 260—429.9)

It has been proposed to use the salts of metals of group II of the periodic system of the elements of the partial esters of di and multibasic saturated and unsaturated carboxylic acids containing from 3 to 10 carbon atoms with aliphatic alcohols containing from 6 to 20 carbon atoms for the stabilization of antioxidant containing low pressure polyolefines against the discoloration developed during processing.

It is known that these molten partial esters react to the formation of salts with the oxides and/or hydroxides of the metals of group II of the periodic system (Physikalisch-chemisches Taschenbuch by H. Staude, Leipzig 1945, Akademische Verlagsgesellschaft, page 140). In this process side reactions occur and as a result, aside from the formation of the salts of the partial esters, substantial amounts of both carboxyl groups of the dicarboxylic acids liberated by the splitting of alcohol are neutralized. The separation of the half ester salts from the resulting dicarboxylic acid salts is difficult.

It has been found that the production of salts of the metals of group II of the periodic system with the partial esters of di and multibasic saturated and unsaturated carboxylic acids having from 3 to 10 carbon atoms and aliphatic alcohols having from 6 to 20 carbon atoms can be carried out especially advantageously if the corresponding oxides and/or hydroxides of the metals are reacted with the partial esters in indifferent solvents and/or suspension media which contain from 0.5 to 20% by volume of lower aliphatic alcohols. Partial alcoholysis reactions take place if higher alcohol concentrations are used.

Calcium, magnesium and zinc are especially suitable for use as the salt forming elements of group II of the periodic system which are supplied in the form of their oxides and/or hydroxides. The partial esters are made in the known manner by the partial esterification of di or multibasic saturated or unsaturated carboxylic acids such as malonic, succinic, glutaric, adipic, pimelic and sebacic acids as well as maleic, fumaric and itaconic acids and also citric and aconitic acids with aliphatic alcohols such as n-hexyl, octyl, nonyl and lauryl alcohols. The remaining free carboxyl groups are then combined with the metals of group II of the periodic system as salts. The calcium, magnesium and zinc salts of maleic acid monolauryl ester and the calcium salt of adipic acid monoethylhexyl ester are preferred.

Suitable indifferent solvents and/or suspension media are, e.g. benzene, toluene, chloroform, carbon tetrachloride and dioxane either singly or as mixtures.

Suitable lower aliphatic alcohols are, methyl, ethyl and propyl alcohols and mixtures thereof. Preferably the alcohol and the solvent and/or suspension medium is so chosen that the solvent mixture is as homogeneous as possible. The reaction suitably is carried out at temperatures between 10 and 120° C., preferably within the range from 30 to 80° C. The separation of the water formed by the reaction, the solvent or suspension medium and the unreacted alcohol is carried out in known manner. The yield of the ester salt amounts to about 95% when the reactants are used in equimolecular amounts or when the oxide and/or hydroxide is used in small excess. The ester salts, after separation of the reaction water and the solvent and suspension medium is of such high purity that they can be used directly as stabilizing agents without purification or other treatment. The ester salts suitably are dissolved in higher boiling esters and used in this form.

*Example 1*

98. g. (1 mol) of maleic acid anhydride is esterified in known manner with 187 g. (1 mol) of lauryl alcohol. The resulting maleic acid monolauryl ester is mixed with 200 $cm.^3$ of carbon tetrachloride and 5 $cm.^3$ of ethanol and 21 g. of calcium oxide and 9.2 g. of calcium hydroxide are quickyl added with stirring at 30° C. The temperature of the reaction mixture rises to about 60° C. Water and solvent are then removed by distillation and the remainder, 285 g., is the calcium salt of maleic acid monolauryl ester. The yield is 94% of the theoretical yield.

The product has a melting point 117 to 118° C. Its calculated saponification number in mg. of KOH per g. is 185; found 188. Its calculated Ca content is 6.6%; found 6.7%.

*Comparison 1.*—If the process of Example 1 is carried out without the described addition of ethanol the result will be 200 g. of the calcium salt of maleic acid monolauryl ether, that is, only 66% of the theoretical yield, calcium maleate, unreacted maleic acid monolauryl ester and lauryl alcohol.

*Comparison 2.*—The maleic acid monolauryl ester of Example 1 was dissolved in 20 $cm.^3$ of benzene and 200 $cm.^3$ of ethanol and neutralized at 30° C. with 21 g. of calcium oxide and 9.2 g. of calcium hydroxide. After expelling the water and solvent a calcium salt mixture (76% by weight) was separated from the residue having a saponification number of about 210 mg. KOH/g. and in which lauryl alcohol has been substituted in part by ethanol.

*Example 2*

The maleic acid monolauryl ester produced as described in Example 1 was dissolved in 200 $cm.^3$ of chloroform and 5 $cm.^3$ of ethanol and neutralized with a mixture of 20.7 g. of zinc oxide and 18.5 g. of calcium hydroxide at 30° C. After the distillation of water and solvent the mixed salt of the half ester was left in practically pure form. By stirring with 50 g. of octylstearate the salt mixture was dissolved completely.

*Example 3*

100 g. (1 mol) of succinic acid anhydride was esterified in the usual way with 187 g. (1 mol) of lauryl alcohol. The resulting succinic acid monolauryl half ester was mixed with 200 $cm.^3$ of benzene and 20 $cm.^3$ of ethanol and neutralized at 30° C. with a mixture of 14 g. of calcium oxide and 18.5 g. of calcium hydroxide. After azeotropic separation of the reaction water and expulsion of the solvent 271 g. of the calcium salt of succinic acid monolaurylester, that is, 89% of the theoretical yield was recovered.

*Example 4*

The maleic acid monolauryl ester produced according to Example 1 was dissolved in a mixture of 200 $cm.^3$ of chloroform and 4 $cm.^3$ of ethanol, the solution was cooled to 30° C. and 22 g. of magnesium oxide were added. The temperature rose to 60° C. Then water and solvent were removed by distillation. The resulting product was 280 g. (95% of the theoretical yield) of the magnesium salt of the maleic acid monolauryl ester. Mg-calc. 4.07%; found 3.96%.

The results were the same when 2 $cm.^3$ of methanol and 2 cm.³ of 1-propanol were substituted for the 4 cm.³ of ethanol.

*Example 5*

98 g. (1 mol) of maleic acid anhydride was esterified in known manner with 251 g. (1 mol) of stearyl alcohol (containing palmityl alcohol) (OH-number 223 mg. KOH/g.), whereby the maleic acid monostearyl half ester was obtained. This half ester was mixed with 200 cm.³ of chloroform and 6 cm.³ of ethanol. Then, at 30° C. 21 g. of magnesium oxide were added while stirring the mixture. The temperature rose to 62° C. The magnesium salt of maleic acid monostearyl ester can be isolated. The yield was 95% of the theoretical yield. Its calculated Mg content was 3.38%; found 3.64%.

*Example 6*

Reacting 29 g. of calcium oxide in the same manner as described in Example 5 instead of 21 g. of magnesium oxide, the calcium salt of maleic acid monostearyl ester is obtained in the same yield.

I claim:
1. Process which comprises reacting at least one member selected from the group consisting of the oxide and the hydroxide of a metal of group II of the periodic system with a partial ester of an acid selected from the group consisting of di and multibasic saturated and unsaturated aliphatic carboxylic acids having from 3 to 10 carbon atoms and an aliphatic alcohol having from 6 to 20 carbon atoms, in substantially chemically equivalent amounts at a temperature within the range from 10 to 120° C., and in a substantially homogeneous liquid medium consisting essentially of from 0.5 to 20% by volume of at least one lower aliphatic alcohol and 99.5 to 80% by volume of a liquid that is inert under the reaction conditions.

2. Process as defined in claim 1 in which the reaction carried out at a temperature within the range from 30 to 80° C.

3. Process as defined in claim 1 in which the metal of group II of the periodic system is a metal selected from the group consisting of calcium, magnesium and zinc.

4. Process as defined in claim 1 in which the lower aliphatic alcohol is a member of the group consisting of methyl alcohol, ethyl alcohol and propyl alcohol.

No references cited.

TOBIAS E. LEVOW, *Primary Examiner.*

H. M. S. SNEED, *Examiner.*